US008398347B2

(12) United States Patent
Woodall et al.

(10) Patent No.: US 8,398,347 B2
(45) Date of Patent: Mar. 19, 2013

(54) INTEGRATED NUTPLATE AND CLIP FOR A FLOATING FASTENER AND METHOD OF MANUFACTURE AND ASSEMBLY

(75) Inventors: Wayne K. Woodall, Oro Valley, AZ (US); Walter S. Pope, Tucson, AZ (US); E. Russ Althof, Tucson, AZ (US); Scott A. Muse, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 195 days.

(21) Appl. No.: 12/970,051

(22) Filed: Dec. 16, 2010

(65) Prior Publication Data

US 2011/0103918 A1    May 5, 2011

Related U.S. Application Data

(63) Continuation of application No. 11/943,674, filed on Nov. 21, 2007, now Pat. No. 7,921,539.

(51) Int. Cl.
*F16B 37/04* (2006.01)
(52) U.S. Cl. .................. 411/85; 403/21; 403/408.1
(58) Field of Classification Search .......... 411/84, 411/85, 111–113, 970, 90, 92, 522; 403/21, 403/408.1
See application file for complete search history.

(56) References Cited

U.S. PATENT DOCUMENTS

| | | | | | |
|---|---|---|---|---|---|
| 2,144,350 | A | * | 1/1939 | Swanstrom | 411/84 |
| 2,144,553 | A | * | 1/1939 | Simmonds | 411/111 |
| 2,469,312 | A | * | 5/1949 | Poupitch | 411/85 |
| 3,259,166 | A | * | 7/1966 | Hernadi | 411/103 |
| 4,571,135 | A | * | 2/1986 | Martin et al. | 411/85 |
| 4,695,212 | A | * | 9/1987 | Berecz | 411/85 |
| 4,895,484 | A | * | 1/1990 | Wilcox | 411/85 |
| 5,405,228 | A | * | 4/1995 | Reid et al. | 411/183 |

* cited by examiner

*Primary Examiner* — Flemming Saether
(74) *Attorney, Agent, or Firm* — Eric A. Gifford

(57) ABSTRACT

An inexpensive and reliable floating fastener is provided by manufacturing an integrated nutplate into the backside of the interior structural member. A retention clip engages the nutplate to capture the nut while allowing the nut to float. The integrated nutplate roughly aligns the floating nut to the axial through-hole in the structural member and provides the torque resistance required to drive the screw into the nut. The retention clip holds the nut in place and provides the axial resistance required for the lead chamfer of the screw to engage the nut and resist the axial loading on the screw during installation. The nutplate is designed to facilitate cost-effective manufacturing. The per hole cost of the integrated floating-fastener is approximately 30% of the cost of the industry standard riveted floating fastener.

6 Claims, 12 Drawing Sheets

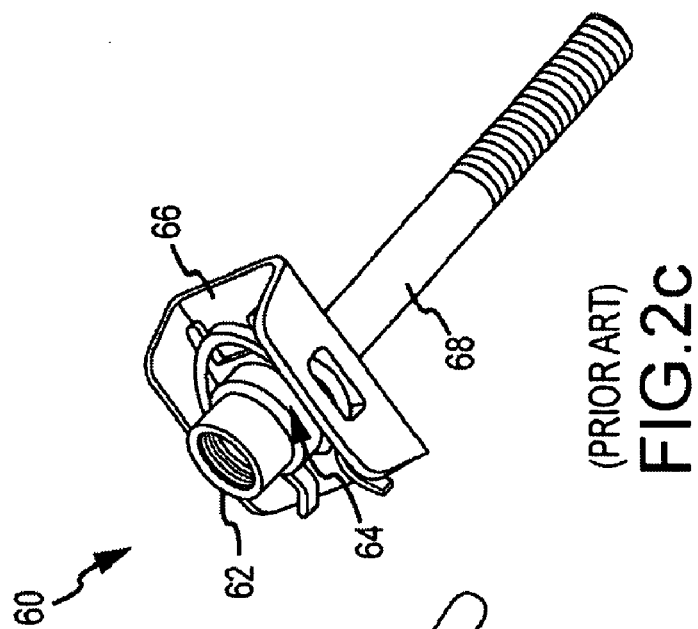
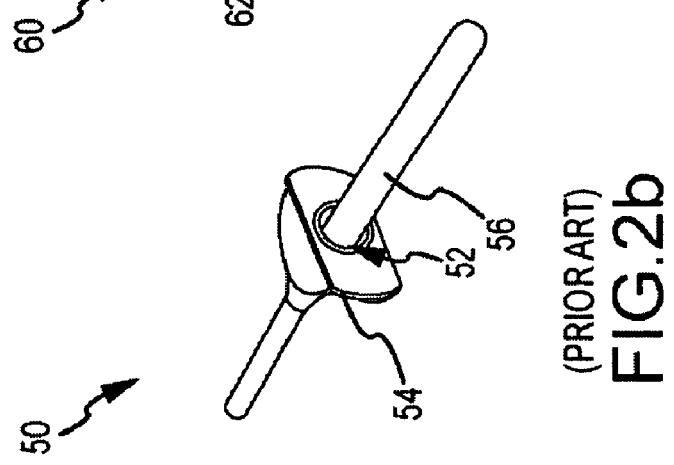
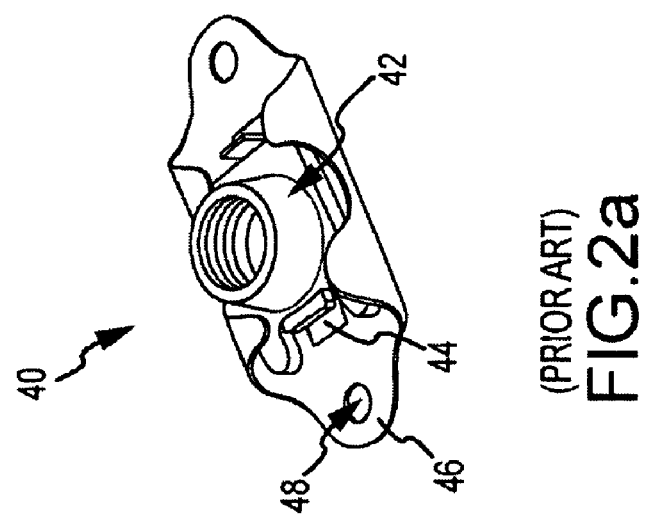

| DESCRIPTION | PART NUMBER | APPROX QTY USED [1] | UNIT COST, $ | COST PER ASSEMBLY, $ |
|---|---|---|---|---|
| EXISTING BLOCK 1 HARDWARE: | | | | |
| NUT PLATE, DUAL FLANGE, .25-28 UNF [3] | NAS1870CL4-2 | 80 | 0.878 | 70.24 |
| NUT PLATE, SNGL FLANGE, .25-28 UNF [3] | 4212084-7 | 80 | 1.320 | 105.60 |
| RIVETS | MS20427-F3-5 | 320 | 0.031 | 9.92 |
| INSTALL LABOR [3,4] | | | 3.312 | 883.2 |
| FINISH LABOR (WET CHROMATE) | | | 0 - INCL | 0 |
| TOTAL | | | | 1068.96 |
| CLICK BOND NUTPLATES | | | | |
| NUT PLATE, DUAL FLANGE, .25-28 UNF [2] | CB6009CR4-3P | 80 | 2.400 | 192.00 |
| NUT PLATE, SNGL FLANGE, .25-28 UNF [2] | CB6011CR4-3P | 80 | 2.400 | 192.00 |
| ADHESIVE, ACRYLIC-BASED | CB359 | 80 | 0.120 | 9.60 |
| INSTALL LABOR [5] | | | 1.260 | 201.60 |
| FINISH LABOR (ABRADE AND POST SEAL) | | 0 | 0.360 | 57.6 |
| TOTAL | | | | 652.80 |
| TEXTRON RIVETLESS NUTPLATES | | | | |
| NUT PLATE, .25-28 UNF [2] | CNP02C4-3-03CC | 160 | 1.900 | 304 |
| INSTALL LABOR [4] | | | 2.100 | 336 |
| FINISH LABOR (WET CHROMATE, APPROX.) | | | 0.120 | 19.2 |
| TOTAL | | | | 659.20 |
| INTEGRATED NUTPLATE | | | | |
| MILLING OF NUTPLATE | | | | $160 |
| NUT & CLIP (ASSEMBLED) | NAS 1794 (NUT) & 4212268-1 (CLIP) | 106 | 1.06 | $169.60 |
| TOTAL $ | | | | $329.60 |

INTEGRATED NUTPLATE AND CLIP FOR A FLOATING FASTENER AND METHOD OF MANUFACTURE AND ASSEMBLY

CROSS-REFERENCE TO RELATED APPLICATIONS

This application claims benefit of priority under 35 U.S.C. 120 as a continuation application of co-pending U.S. patent application Ser. No. 11/943,674 entitled "Integrated Nutplate And Clip For A Floating Fastener And Method Of Manufacture And Assembly" and filed Nov. 21, 2007, the entire contents of which is incorporated by reference.

GOVERNMENTAL LICENSE RIGHTS

The U.S. Government has a paid-up license in this invention and the right in limited circumstances to require the patent owner to license others on reasonable terms as provided for by the terms of contract No. N00019-03-C-0001 awarded by Naval Air Systems Command.

BACKGROUND OF THE INVENTION

1. Field of the Invention

This invention relates to floating fasteners and, more particularly, to the design, manufacture and assembly of a floating fastener having an integrally-formed nutplate and retention clip that provides the same reliable fastener installation at far lower cost.

2. Description of the Related Art

In many structural applications, structural members need to be fastened together. Oftentimes the structural members are too thin, too soft or otherwise too fragile to simply drive a screw through the members to form a reliable joint. Furthermore, misalignment of the structural members will exert a side loading on the screw that will limit the strength of joint. A common solution is to form aligned axial through-holes in the structural members having a diameter greater than that of the screw threads. A threaded nut is held on one side and the screw is driven through the axial through-holes into the nut so that the screw is placed under tension with no side loading to form a strong and reliable bolted joint at the interface of the two members.

To support cost-effective manufacturing and assembly, the axial through-hole on the interior structural member is oversized, which relaxes the positional tolerance on manufacturing the holes and assemblying the structural device to align the axial through-holes. In many applications, there may be dozens of through-hole pairs that need to be simultaneously aligned and then fastened. To further complicate matters, in situations referred to as 'blind access' the machine or technician that is installing the screw does not have access to the backside of the assembly to hold the nut. In these cases, a 'floating fastener' is pre-assembled on the backside of the interior structural member. The floating fastner includes the threaded nut and a nutplate that captures the nut but allows it to 'float' i.e. move around freely inside the nutplate, to accommodate misalignment of the axial through-holes within a designed for tolerance. The lead chamfer on the screw will engage the nut and move it over so that the nut and screw are properly aligned.

Due in large part to the inability to access the backside of the structure once assembly has begun, the floating fastner assemblies must be highly reliable; they must work every time. Rework is slow and expensive. The floating fastener must have a low risk of installation damage e.g., damage to the structural members and particularly the axial through-holes, and must have a low risk to installed performance e.g. the nut won't fall off prior to assembly and the nutplate will provide the requisite axial and torque resistance to hold the nut in place to install the screw properly. Without sacrificing reliability, the "per hole" cost of each fastener including components and labor should be as low as possible. Structural applications may require dozens of floating fasteners and the costs add up quickly.

As illustrated in FIG. 1, existing designs of a floating fastener 10 that are currently available including "riveted", which is the MIL-spec standard, "click bond" and "press fit" place a nut 12 (e.g. MIL-spec NAS 1794) including a threaded barrel 14 on a base 16 in a discrete nutplate 18. The blank nutplate 18 is machined with four protrusions 20 at its corners that are crimped to capture the base 16 of nut 12 yet allow it to float within the cage. The floating fastener is secured by some 'means' to the backside of an interior structural member 22 so that the barrel lies within the extent of an oversized axial through-hole 24. An exterior structural member 26 having axial through-hole 28 is placed over the interior structural member 22 so that their through-holes 28 and 24 are roughly aligned providing enough overlap to insert a screw 30 so that its lead chamfer 32 will engage the barrel and move the nut over so that the nut and screw are properly aligned. The cost associated with machining of the nutplate 18 and the labor to crimp the nutplate to capture the nut is not insignificant, approximately $0.90 to $2.40 per hole plus labor. All of the existing designs use some singular 'means' to align the nutplate and nut to the axial through-hole and hold it in place, to provide the axial resistance required so that the lead chamfer engages the nut and resists the axial load from driving the screw into the nut, and to provide the torque resistance required to prevent the nut and nutplate from turning. The different means vary in reliability and cost.

As shown in FIG. 2a, a riveted floating-fastener 40 includes a nut 42 and nutplate 44 in which the nutplate is machined with a pair of flanges 46 on opposite sides of the nut each having a precision hole 48 formed therein for receiving a rivet. In an alternate embodiment, for use in corners for example, both precision holes 48 are formed in a single flange to one side of the nut. The precision holes 48 must be aligned and spaced to precisely match complementary holes formed on opposite sides of the axial through-hole in the interior structural member. Rivets are driven through precision holes 48 into the mating holes in the interior member. Each rivet is a compressed metal column that expands outward to fill the hole in the structural member to hold the nutplate in place. The riveted floating-fastner is the mil-spec standard because of the low technical risk associated with the rivets, they provide a very strong and reliable joint to hold the nutplate. There is some risk of installation damage during rivet installation. The tradeoff is that the assembled cost is quite high, approximately $6.69 per hole for Raytheon's JSOW. The riveted fastener requires five machining operations using three different tools and three different assembly operations.

As shown in FIG. 2b, a click-bond floating fastener 50 includes a nut 52 and a nutplate 54 that is adhesively bonded to the backside of the interior structural member to position nut 52 below the axial through-hole in the member. An applicator 56 is inserted through the nut and used to align the nut and nutplate to the axial through-hol and bond the nutplate using a two-part adhesive and is then removed. Pushing on the applicator during assembly poses some risk. This approach requires only a single machining operation and a single assembly operation but uses two-part adhesives that require 7 days to cure. This fastener uses the same mil-spec nut and a modified nutplate without flanges. The total cost is lower than the riveted fastener, approximately $4.08 per hole, but still high. However the adhesive bond is not as reliable as the rivets. The bond is known to fail occasionally under the axial and/or torque loading when installing the screw. The bond can also be stressed through a difference in thermal expansion at temperature extremes.

As shown in FIG. 2c, a press-fit floating fastener 60 includes a nut 62, a sleeve 64 formed with teeth around is circumference and a nutplate 66. The sleeve is mounted on a mandrel 68 that pulls the sleeve through the axial through-hole in the interior structural member. The teeth deform the metal on the inside of the hole to hold the nutplate in place and provide axial and torque resistance. Once press-fit into the hole the mandrel is removed. This approach requires only a single machining operation and a single assembly operation using a special tool. The total cost is similar to the adhesive bonding, approximately $4.12 per hole. The installation risk is also similar to bonding in that pressing the teeth into the hole may cause damage. The bigger problem is that the deformation of the axial through-hole creates 'stress risers' that weaken the interior structural member and reduce the reliability of the joint.

The industry has an unfulfilled need for a 'floating-fastener' that provides the same reliability as the riveted fastener but at a much lower total cost per hole. Preferably any such solution could use the MIL-spec nut currently accepted by the industry.

SUMMARY OF THE INVENTION

The present invention provides an inexpensive and reliable floating fastener.

This is accomplished by manufacturing an integrated nutplate into the backside of the interior structural member and providing a retention clip that engages the nutplate to capture the nut while allowing the nut to float. The integrated nutplate roughly aligns the floating nut to the axial through-hole in the structural member and provides the torque resistance required to drive the screw into the nut. The retention clip holds the nut in place and provides the axial resistance required for the lead chamfer of the screw to engage the nut and resist the axial loading on the screw during installation. The nut can be the same commercially available nut as used in conventional floating nutplate designs.

Milling this type of structure in the backside of an otherwise smooth interior structural member would appear to be complicated and thus expensive. However, high speed multi-axis milling machines allow the integrated nutplate to be milled virtually free, assuming a good design is selected. A 'good' nutplate design is one that provides the required torque resistance, facilitates the use of a simple clip to capture the nut and is efficient to mill. These requirements dictate that the nutplate include first and second discrete linear members each having at least one through-hole that is substantially perpendicular to the axial through-hole in the structural member. In an embodiment, the first and second discrete linear members are a pair of parallel rails milled on opposite sides of the axial through-hole. In many applications, the same pair of parallel rails can be used for multiple axial through-holes aligned in a linear configuration. The discrete linear members, e.g. parallel rails, lie along or parallel to an axis of the milling machine so that their formation does not slow the milling of the interior structural member.

In an alternate embodiment, the integrated nutplate is first molded as part of the structural member and then milled to finish the part. Milling is required in order to achieve the required precision of the discrete linear members. The design criteria for a good nutplate are the same.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a-2c, as described above, are diagrams of riveted, bonded and press-fit embodiments of the floating fastener;

FIG. 10 is a table of estimated assembled cost for the known riveted, click bond and press fit fasteners and the integrated fastener for an exemplary missile configuration in accordance with the present invention.

DETAILED DESCRIPTION OF THE INVENTION

The present invention provides an inexpensive and reliable floating fastener by manufacturing an integrated nutplate into the backside of the interior structural member. A retention clip engages the nutplate to capture the nut while allowing the nut to float. The integrated nutplate roughly aligns the floating nut to the axial through-hole in the structural member and provides the torque resistance required to drive the screw into the nut. The retention clip holds the nut in place and provides the axial resistance required for the lead chamfer of the screw to engage the nut and resist the axial loading on the screw during installation. The nutplate is designed to facilitate cost-effective manufacturing. For Raytheon's JSOW the per hole cost is reduced from $6.75 for the MIL-spec standard riveted floating fastener to approximately $1.21. The JSOW includes 160 floating fasteners for a savings of approximately $886 per weapon. The exact per hole cost and total savings will vary depending upon the application but these numbers are representative of the commercial benefit provided by the integral floating fastener without sacrificing reliability.

Figure 1:
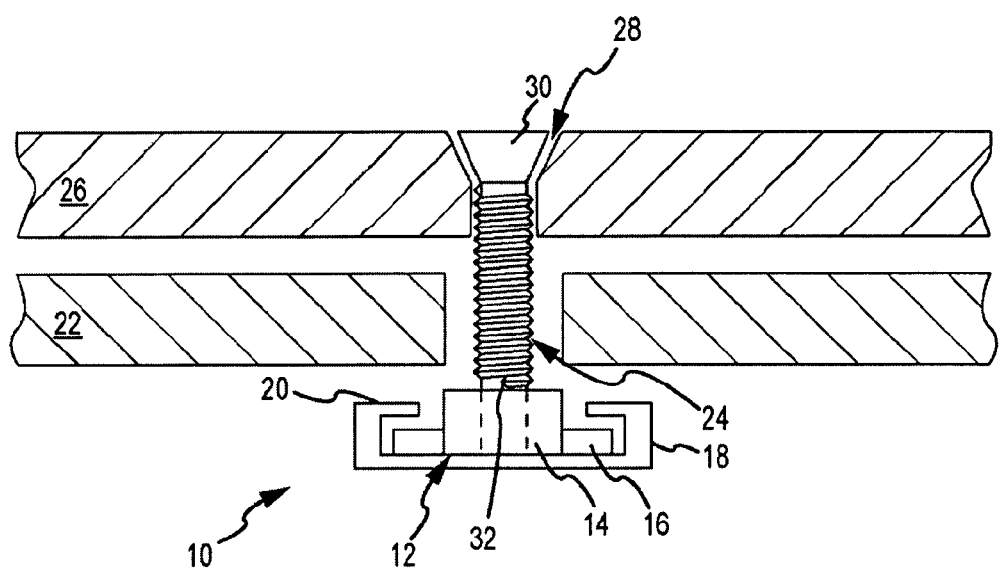
FIG. 1, as described above, is a diagram of a blind-access floating fastener.
Figure 3A:
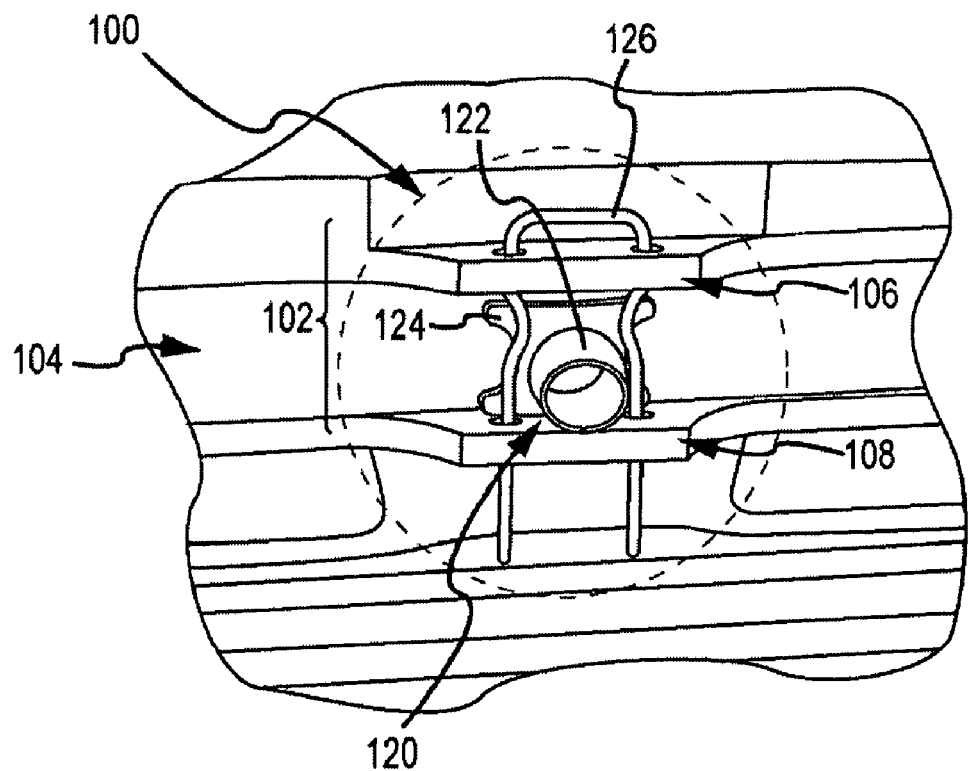
FIGS. 3a-3c are perspective, side and bottom views of a floating fastener including an integrated nutplate and clip in accordance with the present invention.
Figure 3B:
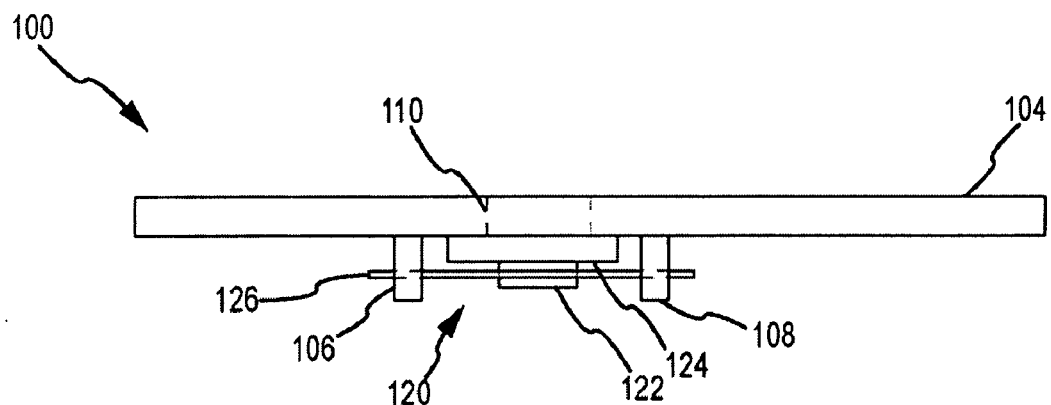
Figure 3C:
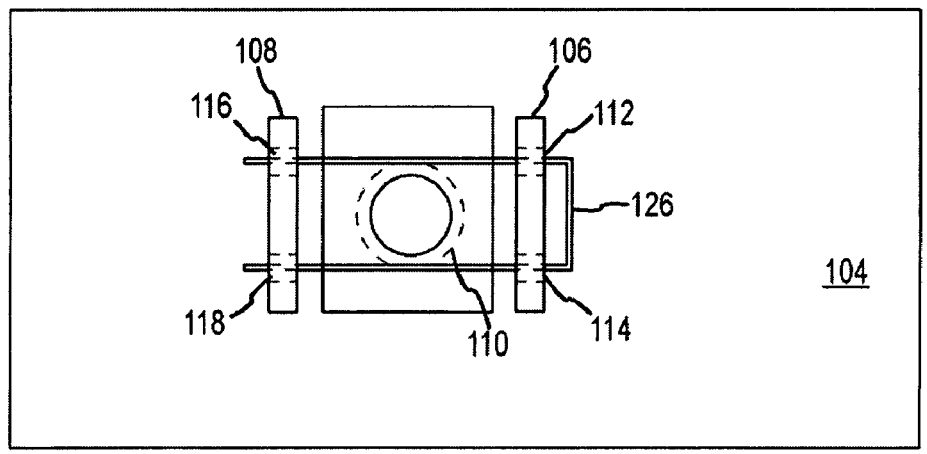

An integrated floating fastener 100 prior to final assembly is illustrated in FIGS. 3a through 3b. Fastener 100 includes an integrated nutplate 102 that has been integrally formed on the backside of an interior structural member 104. In this embodiment, nutplate 102 comprises a pair of parallel rails 106 and 108 suitably spaced at equal distances on other side of oversized axial through-hole 110. Each rail suitably includes a pair of through-holes 112, 114 and 116, 118 that are approximately perpendicular to the axial through-hole. Although other configurations of at least two discrete, linear rails are possible, the pair of parallel rails provides a number of manufacturing, assembly and performance benefits.

Fastener 100 includes a nut 120 such as MIL-spec NAS 1794 having a threaded barrel 122 on a base 124 that is placed between rails 106 and 108 and roughly aligned with axial through-hole 110. A U-shaped retention clip 126 is inserted through through holes 112, 114 in rail 106, around the threaded barrel 122 and over base 124 and extending through the respective pair of through-holes 116,118 in opposing rail 108 so that each said nut 120 is captured by the parallel rails and the retention clip but allowed to float. The clip is suitably 'pinched' at its midsection so that it will not fall out once in place. The rails must be spaced far enough apart to let the nut float by a designed tolerance but close enough that the barrel 122 at least partially overlaps axial through-hole 110 and that when rotated base 124 engages rails 106, 108.

Figure 4:
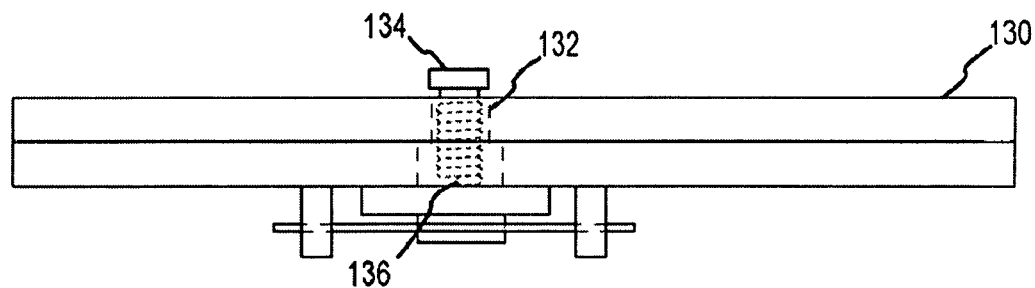
FIG. 4 is a side view of a screw and floating fastener assembly.
Figure 5:
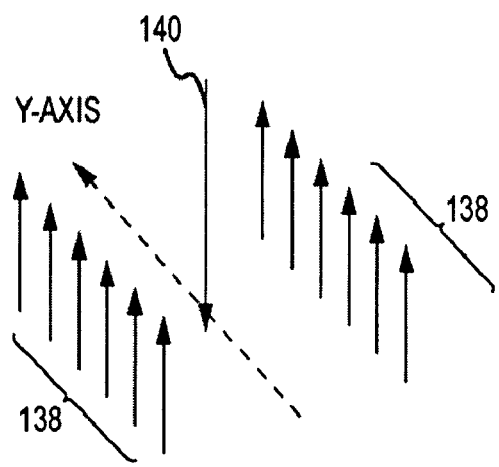
FIG. 5 is a diagram of the axial resistance provided by the clip in response to the axial load placed on the screw during installation to allow the screw to engage the nut.
Figure 6A:
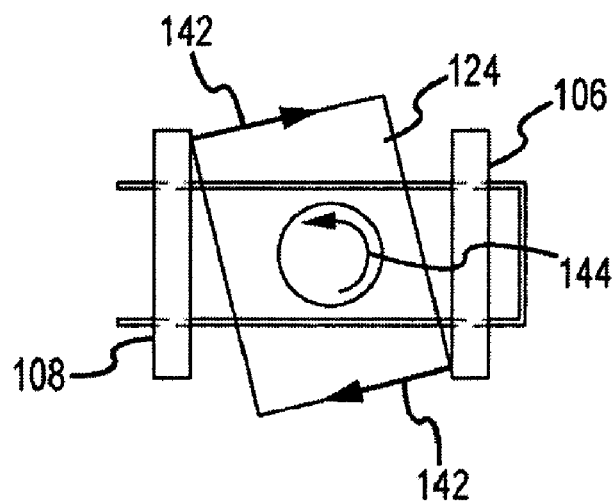
FIGS. 6a and 6b are diagrams of the torque resistance provided by the integrated nutplate in response to the torque placed on the screw during installation to allow the screw to be threaded through the nut.
Figure 6B:
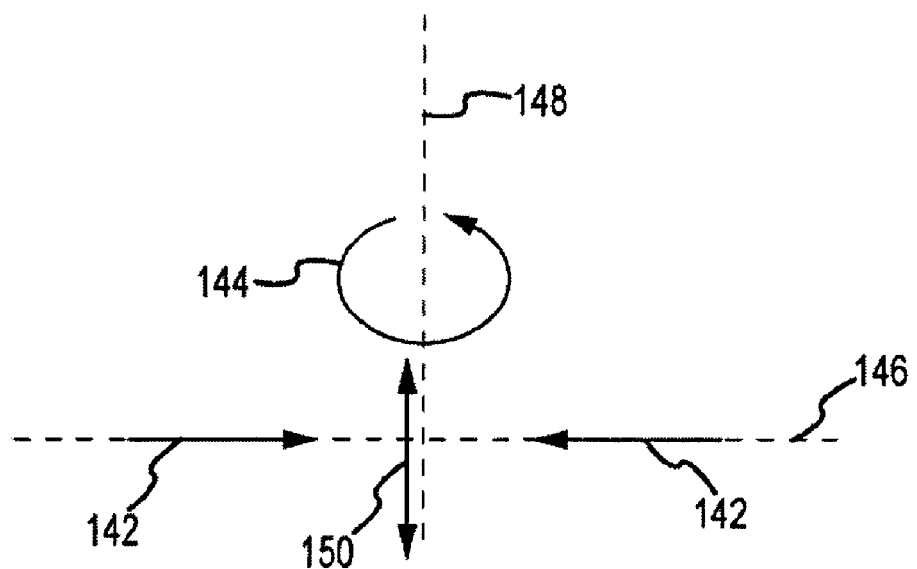

Final assembly of the integrated floating fastener 100 and the axial and torque resistance provided by the fastener are illustrated in FIGS. 4-6. An exterior structural member 130 is positioned over interior structural member 104 so that its axial through-hole 132 is approximately aligned to oversized through-hole 110. A screw 134 is driven through said axial through-holes 132 and 110 so that a lead chamfer 136 on the screw aligns the nut's threaded barrel 122 and the screw. Nut base 124 engages retention clip 126 producing axial forces 138 that resist the axial load 140 placed on the screw during installation. The strength of the retention clip, typically dictated by the diameter of the wire and the spacing between the rails, must be strong enough to provide the required resistance. Furthermore, the parallel rail/U-clip configuration produces axial resistance along both arms of the clip between the rails. This distributed and symmetric force keeps the nut from deflecting at an angle as the lead chamfer engages the barrel. Nut base 124 also engages rails 106 and 108 producing rotational forces 142 that resist the torque 144 placed on the screw during installation. As the screw is driven into the barrel, the applied torque 144 will cause the nut to rotate initially engaging one of the two rails 106 or 108. This will produce a lateral force 142 that will cause the screw to realign slightly until the base engages both rails 106 and 108 before the screw contacts the inside of either axial through-hole. The torque resistance is provided at only two points in a plane 146 substantially perpendicular to the axis 148 of the screw. As a result, no side-loading from either axial through-hole is applied to the screw so that the fastened screw is in near perfect tension 150 as desired.

The final assembly provides a joint at the interface of the interior and exterior structural members that is as reliable as the riveted floating fastener without the installation risk associated with riveting the discrete nutplate to the structural member. The final assembly is done without rivets, adhesive or deformation of the axial through-holes in a press fit configuration. Furthermore, the final assembly is a fraction of the cost of any of the known discrete floating-fasteners.

As mentioned previously, typical applications may use many floating-fasteners to reliably fasten one structural member to another. Raytheon's JSOW is one such example. A U-shaped extended hull 200 is provided to carry the explosives. A complementary shell 202 is positioned over the hull and fastened in 80 different places using floating-fasteners. Only representative portions of the hull and shell are shown. In this, and many other applications, subsets of multiple axial through-holes will lie along an axis in a linear configuration. In JSOW, there are lines on both sides of the hull and lines both ends of the hull (the lines on the ends are actually U-shaped to conform to the hull). The sides may have 21 holes per line and the ends 19 per line. Using conventional approaches, a separate floating-fastener albeit riveted, bonded or press-fit would have to be individually assembled for each hold.

Figure 7A:
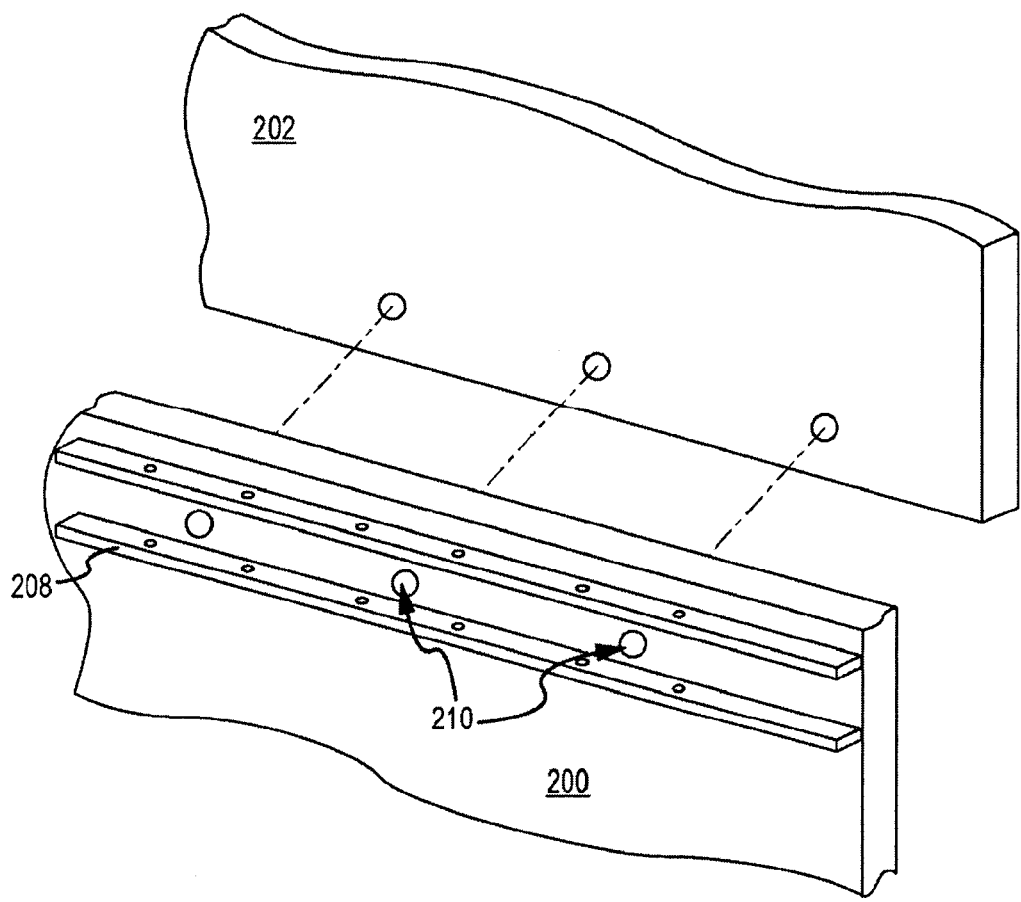
FIGS. 7a and 7b are a diagram of a portion of missile hull provided with an integrated nutplate that spans multiple through-holes for fastening with a portion of a complementary shell and a close-up of the integrated nutplate.
Figure 7B:
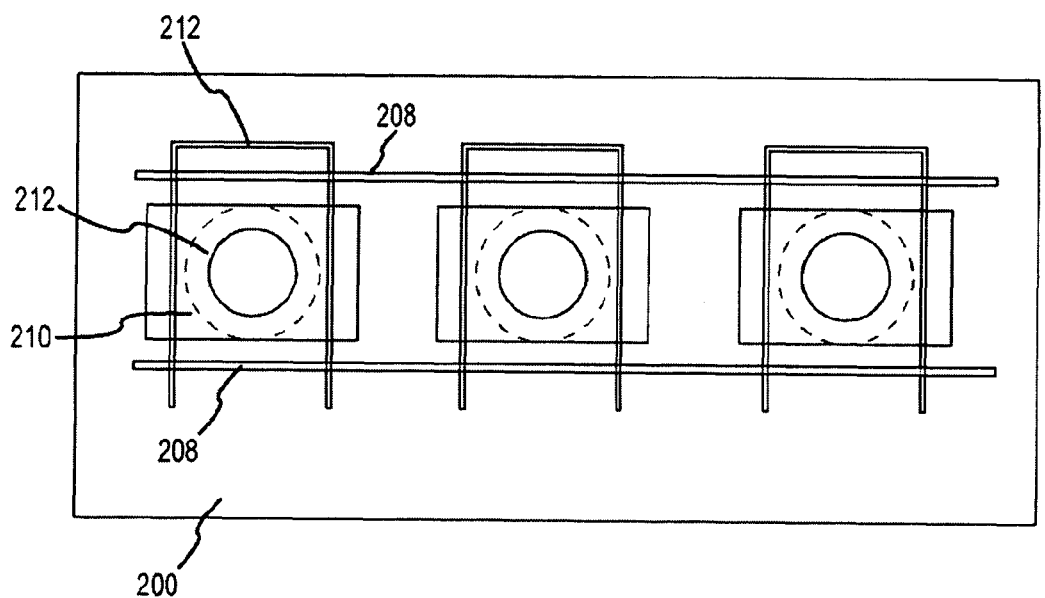
Figure 8:
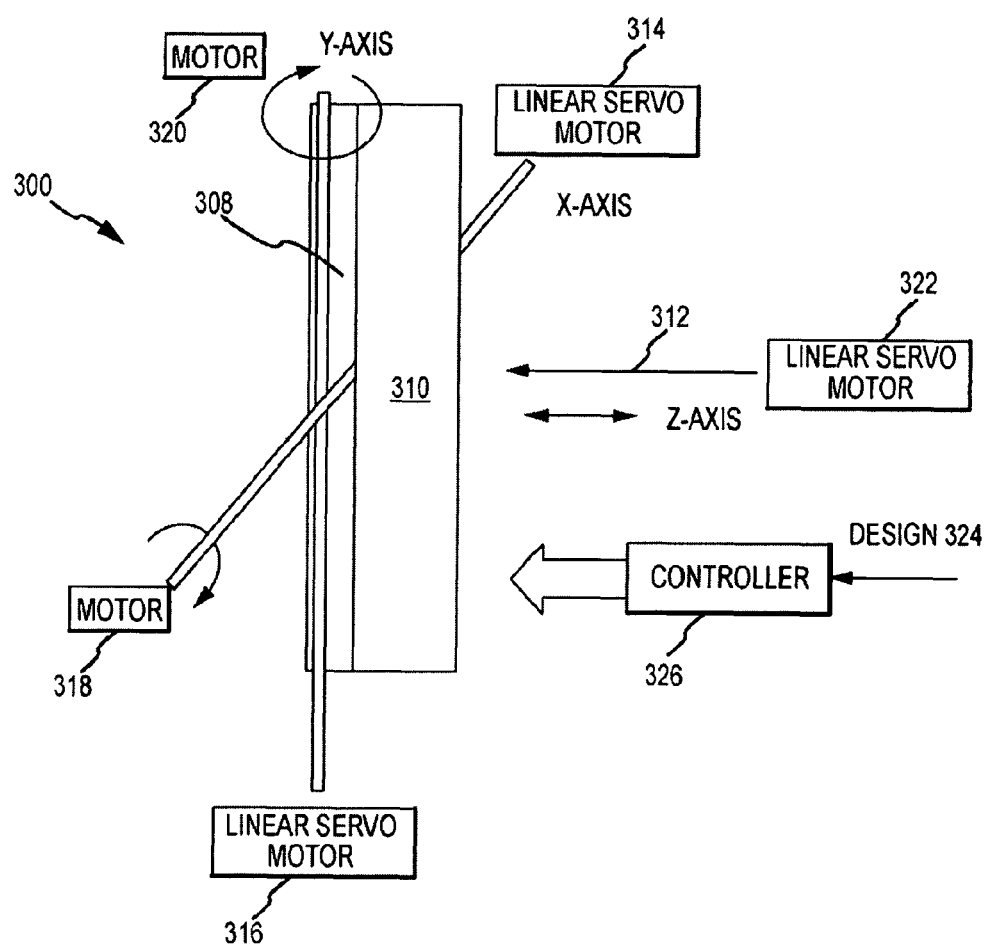
FIG. 8 is a diagram of a 5-axis milling machine for fabricating a structural member having an integrated nutplate for one or more through-holes.

As illustrated in FIGS. 7a and 7b, the integrated nutplate and more particularly the parallel rail configuration of the integrated nutplate allow for considerable savings in final assembled cost. As shown one pair of rails 208 is formed into the hull 200 on opposite sides of the linear arrangement of axial through-holes 210 for each subset. In the JSOW weapon only four rail pairs are required for the 80 holes; one pair for each side and for each end. To complete preassembly of the interior structural member, a technician simply inserts the nut 212 and slides the U-shaped retention clip 214 through the rails to capture the nut and quickly repeats the process. No special tools or applicators are required to complete preassembly.

For the integrated floating-fastener to be as reliable as the MIL-spec riveted fastener and to achieve significant cost savings, the nutplate design must be efficient to manufacture and assemble. Structural members are typically either milled or molded to form the smooth shapes typically encountered depending on the materials or application. Milling is typically used with materials such as aluminum, titanium or because the raw material stock is typically milled to a final shape. Molding is typically used with plastics or composite materials because raw materials are typically cured to a solid finished form to reach the final shape.

Milling this type of structure in the backside of an otherwise smooth interior structural member would appear to be complicated and thus expensive. Currently, machining on a 5-axis high speed machine costs about $400 per hour. If the milling of the integrated nutplate slows the process to any appreciable degree the additional milling costs will outweigh the component and assembly savings. However, high speed multi-axis milling machines allow the integrated nutplate to be milled virtually free, assuming a good design is selected. As described above 'good' nutplate design is one that provides the required torque resistance and facilitates the use of a simple clip to capture the nut, and is efficient to mill. These requirements dictate that the nutplate include first and second discrete linear members each having at least one through-hole that is substantially perpendicular to the axial through-hole in the structural member. If the members are non-linear or connected, the control of the servo motors becomes more complex which slows the milling process and time is money. In an embodiment, the first and second discrete linear members are a pair of parallel rails milled on opposite sides of the axial through-hole. In many applications, the same pair of parallel rails can be used for multiple axial through-holes aligned in a linear configuration. The discrete linear members, e.g. parallel rails, lie along or parallel to an axis of the milling machine so that their formation does not slow the milling of the interior structural member.

FIGS. 8 and 9a-9f provide a simplified depiction of a 5-axis milling machine 300 and the steps for milling a pair of rails 302 and 304 to form an integrated nutplate on the back side of a structural member 306. Milling machine 300 includes a table 308 that supports a block of material 310 and a rotating bit 312 to remove material from the block to form the structural member. The table is actuated by linear servo motors 314 and 316 to move along the X and Y axis respectively and by motors 318 and 320 to rotate around the X and Y axis in the polar and azimuthal angles respectively. A linear servo motor 322 moves the rotating bit back-and-forth along the Z-axis. The specific design 324 of a structural member is loaded into a controller 326 that controls all of the different motors to mill the block of material 310 to form the integrated nutplate on the back side of the structural member.

In general, milling is very efficient to form simple shapes. If the controller can step either the X or Y axis servo motor and then make a long cut down the other of the Y or X axis the material can be removed and the structure formed quickly. Conversely, if the machine has to make short cuts or be controlled to form curves or angles than the process slows dramatically. The machine has to calculate and move in a 3-D cutting path to provide the curves. In addition, the machine may have to make a lot of passes to get the shape smooth.

Figure 9A:
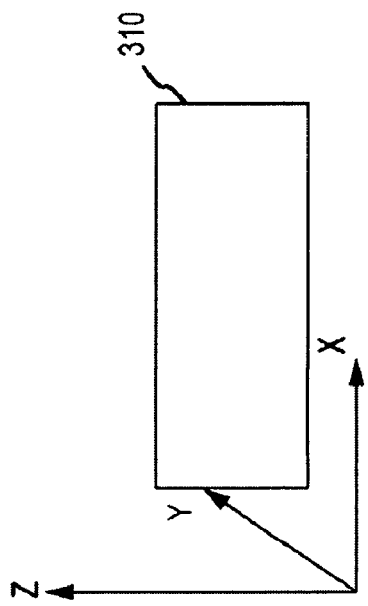
FIGS. 9a-9f illustrate the fabrication of the integrated nutplate depicted in FIGS. 3a-3c.
Figure 9B:
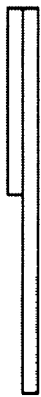
Figure 9C:
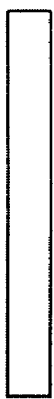
Figure 9D:
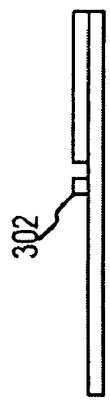
Figure 9E:
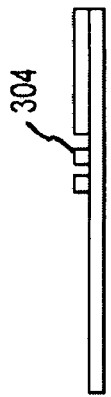
Figure 9F:
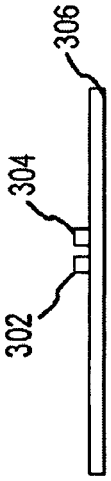

As shown in FIGS. 9a-9e, the pair of rails 302 and 304 for a single or multiple through-holes that define the integrated nutplate can be milled into the backside of structural member 306 virtually for free. The only variations in the process are: (a) when the bit gets to the depth of the rails and the linear servo motor along the X-axis is stepped to the position of the rails, the bit is pulled back so that the material is not removed and step past the rail and (b) once the rails are formed, the table is rotated 90 degrees around the Y-axis and the bit actuated to form the through-holes in the rail. More specifically, the block of material 310 is milled to reduce its thickness to approximately the desired thickness. Note, in this example the structural member is flat but could be a curved shape as in the JSOW hull, this step would be used to form that basic shape in the block. Once at the proper depth, the controller actuates the linear servo motor 314 so that the relative motion of the bit moves left-to-right along the X-axis removing material until the position of the first rail is reached (FIG. 9c). The bit is pulled back and the linear servo member 314 actuated to step the bit to the other side of the rail where it is lowered. The other linear servo member 316 than moves the table so that the bit makes a long cut down the Y-axis to define the first rail 302 (FIG. 9d). One or more steps of the X-axis servo motor 314 may be required to remove the material between the rails. The bit is pulled back and the linear servo member 314 actuated to step the bit to the other side of the second rail 304 where it is lowered. The other linear servo member 316 than moves the table so that the bit makes a long cut down the Y-axis (FIG. 9e) to define the second rail 304. The X-axis servo motor is then stepped and long cuts made to finish the member (FIG. 9f). Motor 320 rotates the table 90 degrees so that the bit can mill the through-holes in rails 302 and 304.

In an alternate embodiment, the integrated nutplate is first molded as part of the structural member and then milled to finish the part. Milling is required in order to achieve the required precision of the discrete linear members. The design criteria for a good nutplate are the same. If a large number of the same part are required, molding is an option. Formation of the mold, usually out of steel, is very expensive. For metallic finished parts such as aluminum or titanium, the parts are either forged by heating the material and pressing it into the mold or cast by pouring molten metal into the mold. Nonmetallic parts such as carbon fibers, fiberglass and other exotic materials can be compression molded. The materials are laid into the mold and cured in a liquid resin. In almost all cases, the molded parts still require precision milling to achieve the size, shape and smoothness tolerances required.

A cost comparison for the riveted, bonded, press-fit and integrated floating-fasteners for Raytheon's JSOW is depicted in FIG. 10. The per hole costs are approximately: riveted $6.69, bonded $4.08, press-fit $4.12 and integrated $2.06. Even using conservative numbers for additional milling time (30 minutes total @$400/hr) and assembly (15 minutes @$100/hr), the per hole cost is reduced substantially to less than 31% of the riveted fastener and less than 61% of the bonded or press-fit fastener. As compared to the riveted fastener, the integrated nutplate saves some expense in component cost but the bulk of the savings is derived from labor to assemble the fasteners. Without sacrificing the MIL-spec reliability, integrated nutplates can save over $700 in cost.

Figure 11:
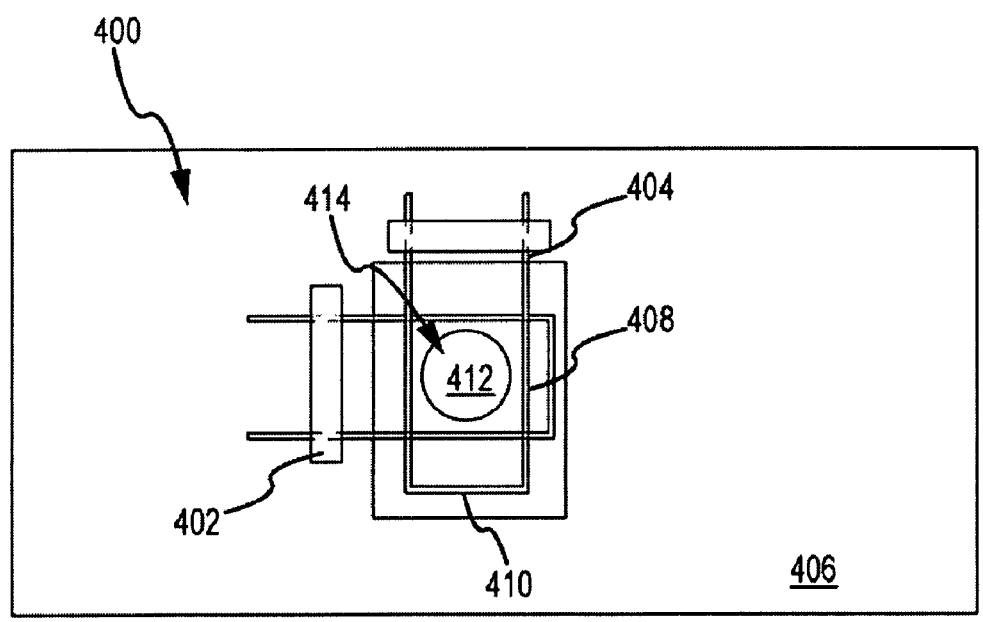
FIG. 11 is an alternate embodiment of the integrated nutplate and retention clip in accordance with the present invention.

An alternate albeit less desirable embodiment of an integrated floating fastener 400 is depicted in FIG. 11. In this configuration, a pair of linear discrete rails 402 and 404 are integrally formed on the backside of structural member 406 perpendicular to one another. First and second clips 408 and 410 are inserted around the barrel 412 of nut 414 into the through-holes in the respective rails 402 and 404, respectively. The clips will provide the axial resistance required to insert the lead chamfer of the screw into the barrel. The pair of rails will provide torque resistance at two points in the same plane sufficient to resist the application torque and fasten the screw into the nut. Although this configuration could be used it is less efficient to mill, requires two clips (or one more complicated clip), and provides a somewhat less reliable cage to capture the nut so that it does not fall out prior to or during assembly. Other configurations of two or more discrete linear members and one or more retention clips that satisfy the design criteria may be used depending upon the application.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fastened structural assembly, comprising:
an exterior structural member having a first axial through-hole, comprising:
an interior structural member having a second axial through-hole larger than said first axial through-hole and an integrally-formed nutplate on the backside of the interior structural member near the second axial through-hole, said exterior structural member positioned over the front side of the interior structural member to align the first axial through-hole to the lancer second axial through-hole, said nutplate comprising first and second substantially parallel rails on opposite sides of the second axial-through hole, each rail having a pair of through-holes substantially perpendicular to the second axial through-hole, said interior structural member extending laterally away from the nutplate on at least one side of the first or second rails;
a nut including a threaded barrel and a base positioned between the first and second rails on the backside of the interior structural member;
a U-shaped retention clip inserted through said pair of through-holes in said rail around the threaded barrel and extended through the pair of through-holes in the other said rail so that the nut is captured by the nutplate and the U-shaped retention clip but allowed to float; and
a screw driven through said first and second axial through-holes so that a lead chamfer on the screw aligns the nut's threaded barrel and the screw, said nut base engaging said clip which resists an axial load placed on the screw and engaging said nutplate's first and second rails which resist a torque placed on the screw so that said screw is fastened into said threaded barrel by the applied torque.

2. The assembly of claim 1, wherein said interior structural member extends laterally on both sides of the first and second rails.

3. The assembly of claim 2, wherein said interior structural extends laterally away from the nutplate on both ends of the first or second rails.

4. The assembly of claim 1, wherein said interior structural member extends laterally away from the nutplate on at least one end of the first or second rails.

5. The assembly of claim 1, wherein said interior structural member comprises a missile hull and said exterior structural member comprises a complementary missile shell.

6. The assembly of claim 1,
wherein said exterior structural member has a plurality of said first axial through-holes in a linear arrangement;
wherein said interior structural member has a like plurality of said second axial through holes in a complementary linear arrangement, said exterior structural member positioned over the front side of the interior structural member to align the linear arrangement of said first axial through-holes to the linear arrangement of the larger second axial through-holes, said integrally-formed nutplate's first and second parallel rails on opposite sides of the complementary linear arrangement of second axial through-holes on the backside of the second structural member, each rail having a pair of through-holes adjacent each said second axial through-hole;
a plurality of said nuts each including a threaded barrel and a base between the first and second parallel rails on the backside of the second structural member over the respective second through-holes;
a plurality of said U-shaped retention clips through respective pairs of through-holes in one rail, around the threaded barrel and extending through the respective pair of through-holes in the opposing rail so that each said nut is captured by the parallel rails and the respective clips but allowed to float; and
a plurality of said screws driven through said first and second axial through-holes so that a lead chamfer on the screw aligns the nut's threaded barrel and the screw, each said nut base engaging said clip which resists the axial load placed on the screw and engaging said nutplate's first and second rails which resist the torque placed on the screw so that said screw is fastened into said threaded barrel by the applied torque.

* * * * *